United States Patent [19]
Cohn et al.

[11] Patent Number: 5,017,769
[45] Date of Patent: May 21, 1991

[54] SURFACE PARTICULATE LASER POWER LIMITER WHICH GENERATES A PLASMA

[75] Inventors: David B. Cohn, Torrance; Wayde H. Affleck, El Segundo; George D. Lawrence, Los Angeles, all of Calif.

[73] Assignee: Hughes Aircraft Company, Los Angeles, Calif.

[21] Appl. No.: 499,236

[22] Filed: Mar. 26, 1990

[51] Int. Cl.⁵ .......................... H01J 3/14; H01J 5/16; H01J 40/14
[52] U.S. Cl. .................................. 250/216; 350/363
[58] Field of Search ................. 250/216; 350/360, 363

[56] References Cited

U.S. PATENT DOCUMENTS

| | | | |
|---|---|---|---|
| 4,597,639 | 7/1986 | Seitel et al. | 350/363 |
| 4,719,342 | 1/1988 | Cohn et al. | 350/363 |
| 4,737,000 | 4/1988 | Garlick et al. | 350/363 |

*Primary Examiner*—David C. Nelms
*Assistant Examiner*—Stephone B. Allen
*Attorney, Agent, or Firm*—William J. Streeter; Wanda K. Denson-Low

[57] ABSTRACT

The invention is a laser power limiter. The limiter incorporates a layer of plasma forming particulate material supported optically in front of a sensor. A focussing means is positioned optically forward of the particulate layer to concentrate incident threat radiation on the particulate layer. The position of the particulate layer relative to the focussing means is selected such that the focal area encompassed by concentrated incident radiation encompasses a sufficient number of particulates to insure protective plasma formation and to insure that damage level incident radiation will be concentrated to an energy level exceeding the plasma formation threshold of the particulate material. The particulate layer is supported on a rotating window such that new areas of the layer can be exposed to incident radiation after a damage radiation incident.

20 Claims, 2 Drawing Sheets

SURFACE PARTICULATE LASER POWER LIMITER WHICH GENERATES A PLASMA

BACKGROUND

The present invention relates to optical power limiting devices, and in particular, to a laser power limiter employing a plasma generating material comprising a particulate coated surface.

Radiation sensors are adapted to sense radiation over a wide band of wavelengths including infrared and visible light. Sensors are used for mapping, targeting, and the like. It is desirable that the sensors have high sensitivity. However, this sensitivity simultaneously renders the sensor susceptible to damage or destruction from threat radiation such as a high power laser beam directed at the sensor. The most important type of threat radiation is a short pulse, high peak power pulsed laser operating in the visible or infrared wavelength regions. Laser power limiters or "optical fuses" are used to protect sensors from such threat radiation.

At the present time, the two most significant laser power limiters are a gas plasma shutter which operates at infrared wavelengths and a liquid-particulate limiter which operates at visible wavelengths. Both of these devices respond to incident laser radiation and produce a plasma interposed between the incident radiation and a sensor. The plasma blocks the radiation by means of reflection, absorption, and diffraction. However, the gas plasma shutter cannot be used in the visible light region because the gas plasma densities produced by the device are not high enough to attenuate visible light. The liquid-particulate limiter is ineffective for use in the infrared region because no liquid has been found that effectively transmits infrared radiation. Both devices require relatively high turn-on thresholds and exhibit a variable probability of turn-on. The liquid-particulate limiter also cannot handle multi-pulse (high repetition rate) threats without implementation of a complicated means of stirring the fluid. Particulate clumping and dissolution are further problems of the liquid-particulate limiter.

Another laser power limiter device is a gas plasma switch based on the use of particulate plasma formation in a gas. This device, however, although quite useful, has a relatively high turn-on threshold, has a relatively low probability of switching, and is only suitable for use with infrared radiation.

Thus, there has heretofore existed a need for an improved radiation limiter that provides low insertion loss, wide wavelength coverage, fast rise time, multi-pulse protection, high attenuation, and fast recovery times.

SUMMARY OF THE INVENTION

To overcome these limitations, there has been developed a laser power limiter, or optical fuse, which incorporates a coated, optically-transmissive surface that is sacrificed when the coating material is ablated or removed by a focussed high power laser pulse. The optically deteriorated surface then diffusely scatters subsequent radiation, thus reducing laser flux on the sensor. However, in order for the sensor to image the scene subsequent to laser irradiation, the coated optically-transmissive surface is moved (rotated) so that a fresh surface without optical defects is provided for transmission of the light from image scene. This laser power limiter is somewhat limited in that the optical surface must be of good quality in its initial state to allow good imaging of the scene by the sensor. This requirement however requires a high activation threshold that allows significant laser radiation to enter the detector before protection is effected.

The laser power limiter incorporates a layer of plasma generating particulate material (also referred to as a particulate layer) employed between a sensor and a source of laser radiation. The particulate layer is relatively thin and its optical transmissivity is typically between 70% and 90%. A focusing or condensing lens arrangement is disposed in front of the particulate layer to concentrate radiation onto a predetermined focal area of the particulate layer. The focal area is determined as a function of the incident laser radiation energy level that is sufficient to cause sensor damage, known as the damage energy level, and the plasma forming energy threshold of the particulate layer. The particulate layer is preferably located on a surface displaced from the focal plane of the focussing lens arrangement so that the focal area is relatively large. This ensures that a large number of particulates are irradiated, thereby ensuring a high probability of plasma formation. The relatively large focal area further ensures that the energy level required to produce plasma formation produces minimal damage in the supporting structure of the particulate layer.

It is therefore a feature of the invention to provide a laser power limiter that incorporates a relatively thin, optically transmissive surface layer of particulate material that is adapted to generate a plasma when irradiated by laser radiation. Another feature of the invention is to provide a power limiter in which laser radiation is focussed onto a predetermined focal area of a particulate layer in a sufficient amount to ensure plasma formation. Another feature of the invention is to provide a power limiter in which a focusing lens arrangement concentrates laser radiation onto a predetermined focal area of the particulate layer sufficient to limit damage to the supporting material on which the particulate layer is disposed. Yet another feature of the invention is to provide a power limiter in which the focal area is sufficiently large so that an adequate number of particulates are subjected to plasma forming threshold energy. Still another feature of the invention is to provide a power limiter that has multiple damage level radiation thresholds. Still another advantage of the invention is to provide a power limiter that is easily and automatically restored to its unirradiated state. Another feature of the invention is to provide a power limiter that exhibits low insertion loss, wide wavelength coverage including ultraviolet to infrared wavelengths, fast rise time, multi-pulse (high repetition rate) protection, high attenuation, and fast recovery time.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
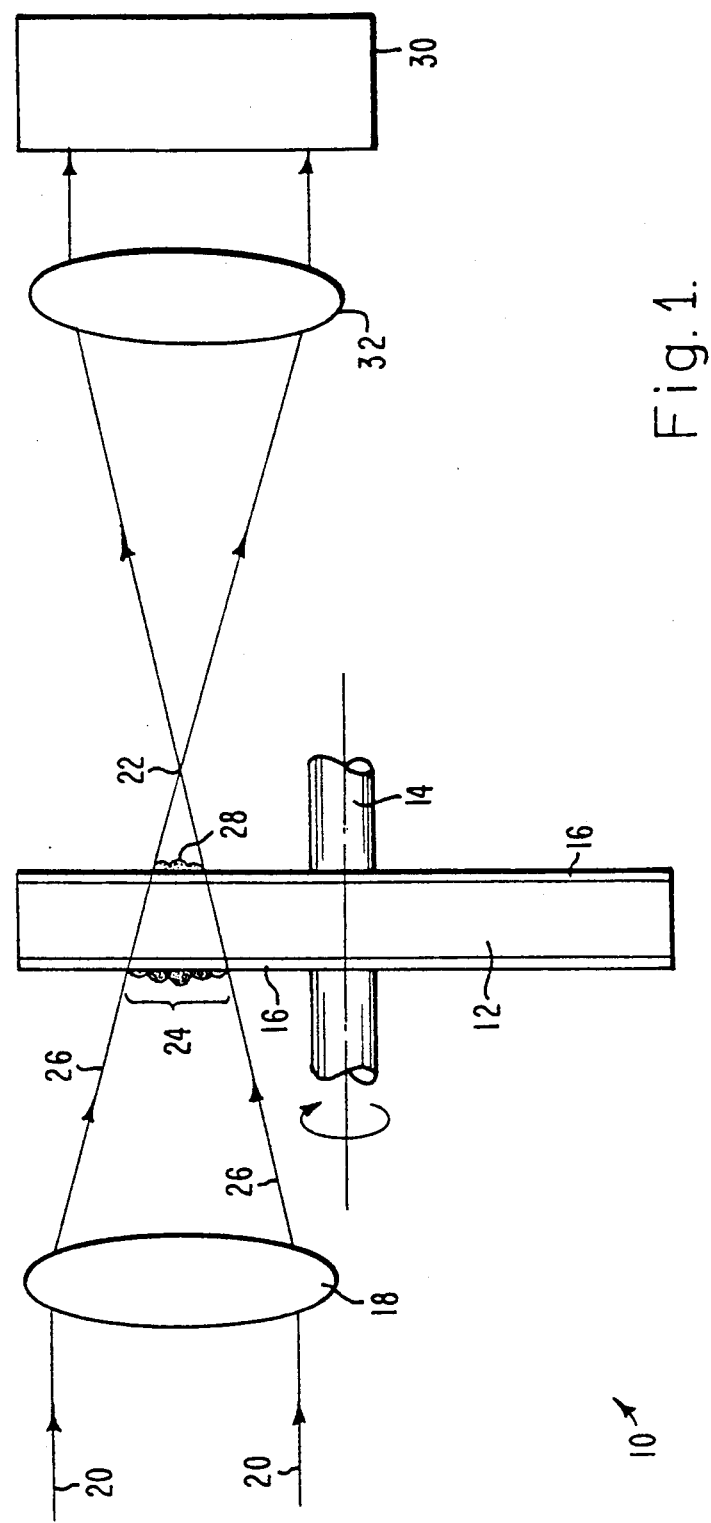
FIG. 1 is an optical schematic showing the optical power limiter in accordance with the principles of the present invention.

Referring now to the drawings, FIG. 1 shows an optical power limiter 10 in accordance with the principles of the present invention. The optical power limiter 10 comprises supporting structure 12, which is typically a disk shaped window made of an optically transparent material, such as zinc selenide or optical quality glass, for example. The supporting structure 12 is disposed on a shaft 14 and the shaft 14 is operatively coupled to a mechanism (not shown) that enables incremental rotation of the supporting structure 12 as will be explained below. At least one surface of the supporting structure 12 is coated with a layer 16 of plasma forming particulate material, also referred to as a particulate layer 16. A suitable particulate material is finely divided carbon having a grain size of 0.5 microns, for example. In FIG. 1, both surfaces of the supporting structure 12 are coated with a particulate layer 16.

The particulate layer 16 is disposed on the surface of the supporting structure 12, typically by means of a vapor deposition process, or by applying mastic to the surface, for example. The particulate layer 16 is applied to a thickness that provides a transmissivity factor of between 70% and 90%, with 80% transmissivity as a nominal value. This typically requires a particulate layer 16 having a thickness of about 1 micron rms when carbon comprises the particulate material.

Disposed in front of the particulate layer 16 is a focusing lens arrangement, comprising a focussing lens 18. The focusing lens 18 is adapted to focus incident radiation 20 that comprises an image scene. A collimating lens 32 is disposed behind the supporting means 12 and in front of a sensor 30. The collimating lens 32 is adapted to collimate applied radiation and transmit it to the sensor 30. In the absence of a plasma formed by the power limiter 10, the collimating lens 32 forms an image of an external image scene at the sensor 30.

The particulate layer 16 is disposed in front of a focal plane 22 of the focusing lens 18. The particulate layer 16 may alternatively be positioned behind the focal plane 22. In either case, the position of the particulate layer 16 is selected such that a focal area 24 encompassed by focussed incident radiation 26 satisfies the following two criteria. Firstly, incident radiation 20 having an energy level sufficient to cause damage or destruction of the sensor 30 must be concentrated on the particulate layer 16 to achieve an energy level sufficient to cause the particulate material comprising the particulate layer 16 to explode, ablate, or otherwise form a plasma 28. Secondly, the focal area 24 must be sufficiently large to ensure that an adequate quantity of particulates are exposed to the focussed radiation 26 to ensure formation of an adequate cloud of plasma 28. Accordingly, the size of the focal area 24 is a function of the damage level energy of the particular sensor 30 with which the power limiter 10 is used in conjunction with the plasma formation energy threshold of the plasma forming particulate layer 16.

In operation, incident radiation is brought to focus at the focal plane 22 by the focussing lens 18. In the absence of a plasma 28 formed by the power limiter 10, the collimating lens 32 forms an image of the external image scene at the sensor 30. The light image is detected by the sensor 30 and subsequently converted into a video image. Prior to the application of laser radiation, it will be recognized that image scene radiation is imaged in a normal manner onto the sensor 30 with a slight image quality loss due to absorption and scattering by the particulate layer 16. However, the large spot size on the particulate layer 16 minimizes this effect.

The particulate layer 16 is disposed at a location such that incident radiation 20 having an energy level sufficient to cause damage to the sensor 30 is focussed to an energy level at the particulate layer 16 sufficient to guarantee ablation thereof. This typically occurs in the presence of applied high power laser radiation, such as by a $CO_2$ laser, for example. The focussed laser radiation produces the plasma 28 by exploding or ablating the particulates comprising the particulate layer 18. The plasma 28 then reflects, absorbs, and diffracts the damaging laser radiation.

Subsequently applied laser radiation, arriving shortly after the first laser pulse, in the case of the high repetition rate laser, for example, is focussed on the ablated damage site and is likewise dissipated by the plasma 28. After the laser pulses cease, the supporting structure 12 is rotated, for example, to a new position to allow unobstructed scene viewing. Typically, rotation of the supporting structure 12 is effected within a period of about 10 milliseconds.

To ensure broadband protection, it is important to have a particulate generated plasma 28 having a plasma density several orders of magnitude higher than is typical for a gas plasma. Such a plasma appears "metallic" at visible wavelengths and at infrared wavelengths. For example, a fully ionized plasma in one atmosphere pressure gas has a plasma frequency of $5 \times 10^{13}$ which is sufficient to reflect 10.6 $\mu$m radiation. However, a plasma frequency 20 times higher is required to reflect visible radiation. This plasma frequency is obtained by a near-solid density plasma, such as is provided by an exploded particulate layer 16. It has further been shown that particulate explosion thresholds are far lower than thresholds required for pure gas plasma formation. Accordingly, the power limiter 10 of the present invention has the attribute of lower threshold activation compared to conventional gas plasma devices. The power limiter 10 also exhibits the benefit of reduced bulk damage caused by heat liberated at the damage site. Such damage can cause structural failures in conventional devices. In tests performed with the power limiter 10, plasma formation time has been determined to be approximately 5 nanoseconds, and attenuation factors on the order of 1,000 have been demonstrated.

Figure 2:
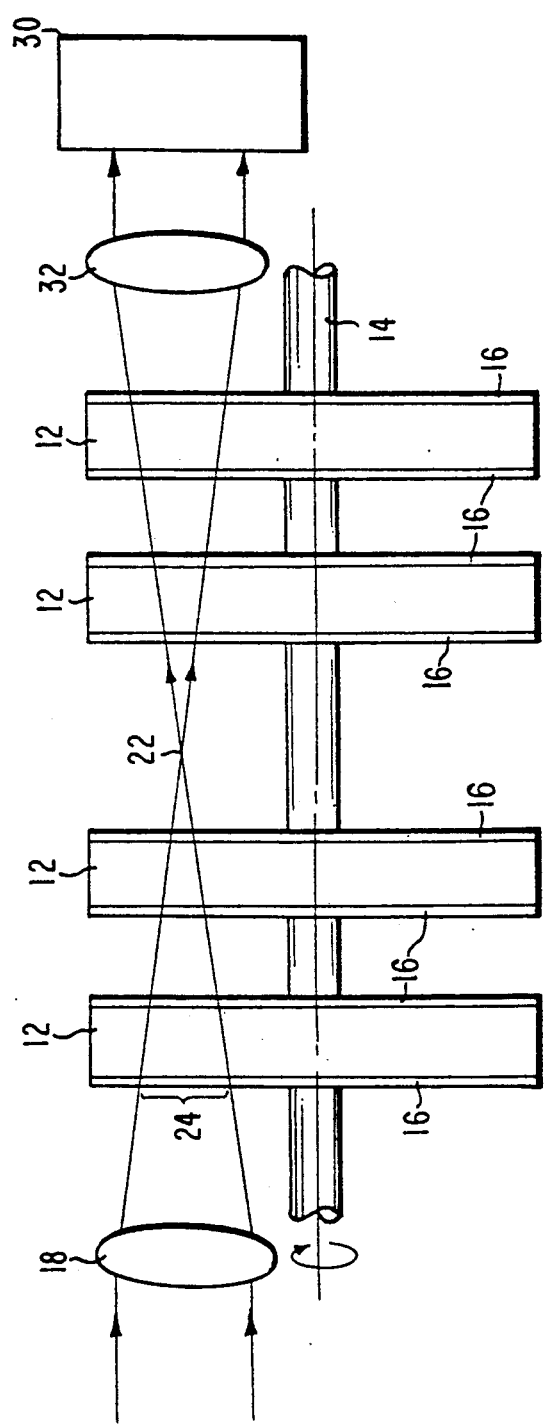
FIG. 2 is an illustration of a second, multiple surface, optical power limiter in accordance with the principles of the present invention.

Referring now to FIG. 2, there is shown a second embodiment of a power limiter 10' in accordance with the principles of the present invention. In this embodiment, a plurality of supporting structures 12 are disposed between the focusing lens 18 and collimating lens 32. At least one surface of each of the plurality of supporting structures 12 is coated with a particulate layer 16 as described above. However, the particulate layer 16 on each of the plurality of supporting structures 12 is formed with decreasing amounts of material, thus providing for relatively increasing transmissivities. Accordingly, the energy threshold at each of the particulate layers 16 increases as progressively concentrated radiation propagates through the successive particulate layers 16. The plasma formation threshold for each particulate layer 16 is set below the damage threshold for the sensor 30. This, again, is a function of the damage level energy of the sensor 30 and the respective focal areas 24 of each particulate layer 16. With this configuration, incident laser pulses are attenuated by respective ones of the particulate layers 16 from left to right (as viewed in FIG. 2).

From the above description, it should now be seen that the optical power limiters 10, 10' of the present invention provide for a surface particulate power limiter that exhibits the characteristics of relatively low insertion loss, wherein the particulate coating typically allows about an 80% energy transmission in its unablated state. The optical power limiters 10, 10' provide broadband coverage providing protection from the visible through infrared wavelengths due to appropriate choice of materials, namely carbon and zinc selenide. The optical power limiters 10, 10' provide fast rise times, typically in the order of 5 nanoseconds. The optical power limiters 10, 10' provide for higher repetition rate protection by reason of the natural occurrence of the damage site or by stacking several particulate layers 16 in series. The optical power limiters 10, 10' provide an attenuation factor of on the order of 1,000. The optical power limiters 10, 10' further exhibit fast recovery allowing a scene to be viewed by a sensor 30 after protective plasma formation by rotation of the supporting structure(s) 12. This recovery period is typically less than 10 milliseconds.

In tests, a zinc selenide window coated with carbon particles was exposed to a solid state laser operating at 0.53 nanometers and in another test, a $CO_2$ laser operating at a wavelength of 10.6 $\mu$m. Carbon particles were coated on a zinc selenide window with a net transmission of 80%. A laser was pulsed with pulses having a 10 microsecond duration. The total beam energy was 44 mJ. In this test, the power limiter 10 transmitted only 4 mJ of energy to the sensor 30 after an initial ablation episode. All subsequent laser pulses were blocked. Using the solid state laser operating in the green portion of the visible spectrum at 0.53 nm wavelength, carbon particles coated on a transparent glass slide, having an effective transmissivity of 75% effected an attenuation factor of 100 for the first and all subsequent laser pulses. Incoming laser radiation 20 in this test was in the order of 10 $\mu$J. From this it will be observed that the threshold for plasma formation is very low. It will further be observed that the attenuation factor becomes much larger for higher laser input energies, which generates higher levels of plasma 28.

Thus there has been described a new and improved surface particulate optical power limiter. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An optical power limiter comprising:
   an optically transparent movable support structure;
   an optically transmissive layer of particulate material disposed on the movable support structure, which particulate material that is adapted to form a high density plasma when subjected to energy having a predetermined plasma formation energy threshold; and
   focussing means adapted to focus incident radiation onto a predetermined focal area of the layer of particulate material, the relative size of the focal area being a function of a predetermined energy threshold and the plasma formation energy threshold of the layer of particulate material;
   whereby incident damage level energy concentrated on the focal area of particulate layer generates a plasma that absorbs, reflects and diffracts the damage level energy.

2. The limiter of claim 1 further includes means for incrementally rotating the supporting structure subsequent to exposure of the layer of particulate material.

3. The limiter of claim 2 wherein the supporting means comprises an optically transparent window.

4. The limiter of claim 3 wherein the window comprises zinc selenide.

5. The limiter of claim 3 wherein the window comprises optical quality glass.

6. The limiter of claim 3 wherein the layer of particulate material comprises a layer of finely divided carbon particles disposed on a surface of the window.

7. The limiter of claim 6 wherein the layer of particulate material has an optical transmissivity between 70 and 90%.

8. The limiter of claim 7 wherein the optical transmissivity of the particulate layer is 80%.

9. The limiter of claim 8 wherein the layer of particulate material is disposed at a plane displaced from the focal point of the focussing means, and wherein the focal area on the layer is selected such that focused radiation sufficient to effect plasma formation occurs at an radiation energy level less than the damage level radiation threshold.

10. The limiter of claim 1 wherein the movable support structure further comprises a plurality of sequentially disposed supporting structures each comprising a layer of plasma forming particulate material, and wherein the transmissivity of each of layers of the sequentially disposed supporting structures has relatively increasing transmissivities.

11. An imaging sensor protection arrangement comprising:
    an imaging sensor disposed along an optical axis and adapted to image an image scene;
    an optically transparent movable support structure;
    an optically transmissive layer of particulate material disposed on the movable support structure, which particulate material is adapted to form a high density plasma when subjected to energy having a predetermined plasma formation energy threshold;
    a focussing lens arrangement disposed along the optical axis and adapted to focus incident radiation onto a predetermined area of the layer of particulate material, the relative size of the area being a function of a predetermined energy threshold and the plasma formation energy threshold of the layer of particulate material;
    an imaging lens arrangement disposed along the optical axis and adapted to image incident radiation onto the imaging sensor;
    whereby incident damage level energy concentrated on the focal area of particulate layer and having an energy level above the plasma formation energy threshold generates a plasma that absorbs, reflects and diffracts the energy to prevent imaging thereof onto the sensor, and whereby movement of the support structure subsequent to irradiation by the damage level energy positions an unirradiated portion of the particulate layer along the optical axis to provide for imaging of the image scene therethrough.

12. The limiter of claim 11 further includes means for incrementally rotating the supporting structure subsequent to exposure of the layer of particulate material.

13. The limiter of claim 12 wherein the supporting means comprises an optically transparent window.

14. The limiter of claim 13 wherein the window comprises zinc selenide.

15. The limiter of claim 13 wherein the window comprises optical quality glass.

16. The limiter of claim 13 wherein the layer of particulate material comprises a layer of finely divided carbon particles disposed on a surface of the window.

17. The limiter of claim 16 wherein the layer of particulate material has an optical transmissivity between 70 and 90%.

18. The limiter of claim 17 wherein the optical transmissivity of the particulate layer is 80%.

19. The limiter of claim 18 wherein the layer of particulate material is disposed at a plane displaced from the focal point of the focussing means, and wherein the focal area on the layer is selected such that focused radiation sufficient to effect plasma formation occurs at an radiation energy level less than the damage level radiation threshold.

20. The limiter of claim 11 wherein the movable support structure further comprises a plurality of sequentially disposed supporting structures each comprising a layer of plasma forming particulate material, and wherein the transmissivity of each of layers of the sequentially disposed supporting structures has relatively increasing transmissivities.

* * * * *